Nov. 9, 1937.  R. B. MILLER  2,098,668
VEHICLE WHEEL
Filed Oct. 30, 1933   3 Sheets-Sheet 1

Inventor
Richard B. Miller

Nov. 9, 1937.    R. B. MILLER    2,098,668
VEHICLE WHEEL
Filed Oct. 30, 1933    3 Sheets-Sheet 2
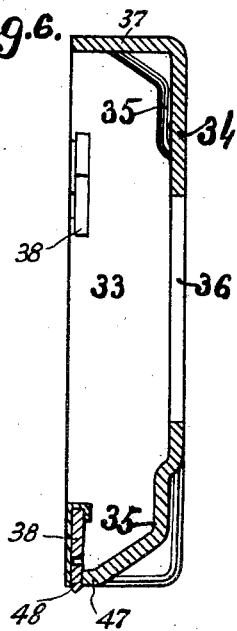
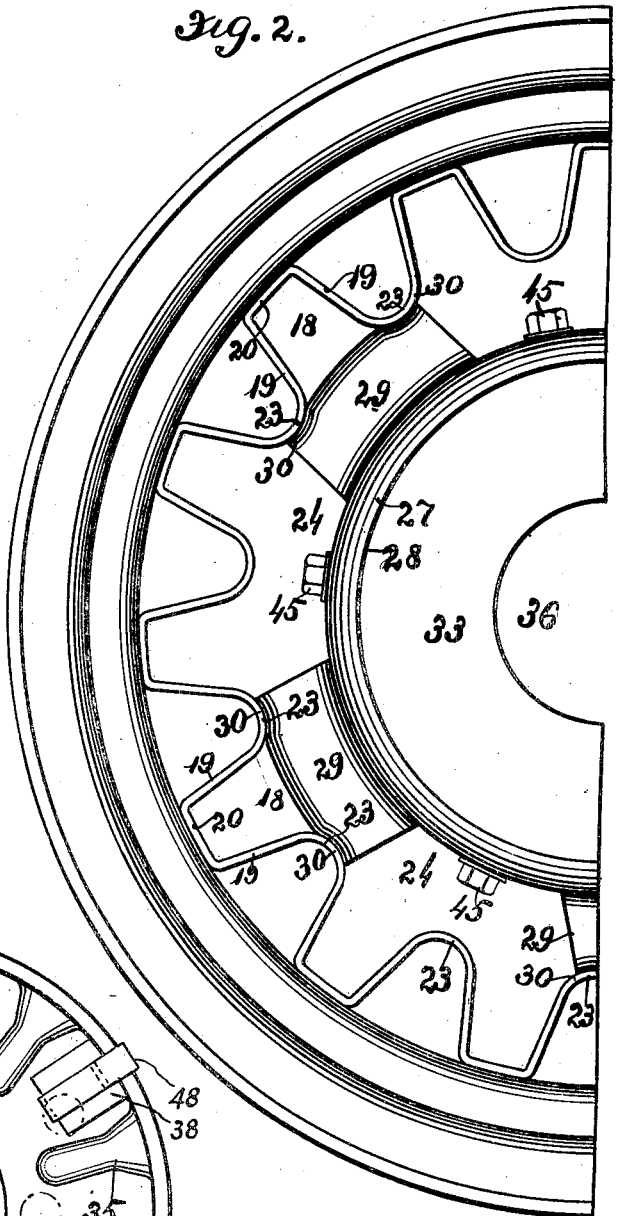
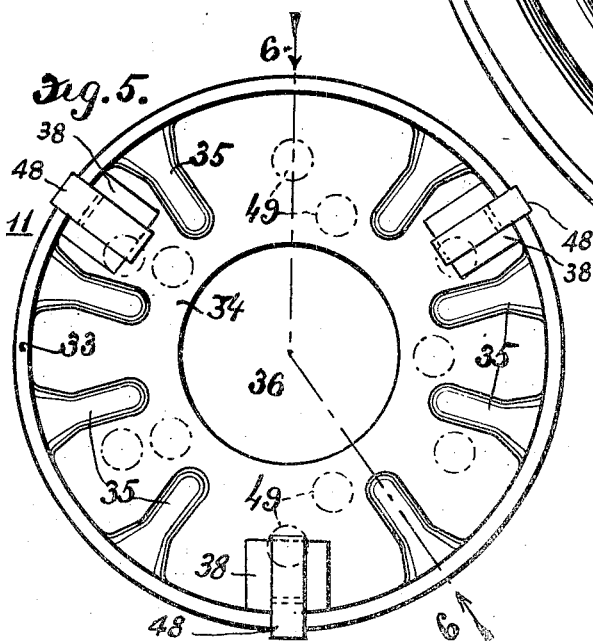
Inventor
Richard B. Miller Nov. 9, 1937.  R. B. MILLER  2,098,668
VEHICLE WHEEL
Filed Oct. 30, 1933  3 Sheets-Sheet 3

Inventor
Richard B. Miller

Patented Nov. 9, 1937

2,098,668

UNITED STATES PATENT OFFICE 2,098,668

VEHICLE WHEEL

Richard B. Miller, Brooklyn, N. Y., assignor to Bendix Products Corporation, South Bend, Ind., a corporation of Indiana Application October 30, 1933, Serial No. 695,821

1 Claim. (Cl. 301—64)

The invention relates to a demountable pressed or stamped metal artillery wheel assembly as a construction improved on the conventional vehicle wheels in general, and particularly, the demountable type.

The principal object of the invention is the manufacture of a general demountable wheel assembly particularly for passenger automobiles as standard equipment and universally the replacement market as a changeover for the ordinary wheel employed in service on the road with vehicles.

Another object of the invention is the provision of a pressed or stamped artillery wheel assembly which comprises a so-called "drop-center" tire-rim, a wheel member formed with considerably short, sturdy channeled spokes closed at their radially outward ends and open at their radially inward ends integrally merged with an annular body terminating in the formation of an annular laterally inwardly extended flanged body, a detachable, reinforced annular reinforcing cylindrically flanged bolting-on member, and a cup-shaped member snapped on the outboard side of the flanged bolting-on member to enclose the greater diametrical portion of the wheel nave to prevent ingress of foreign matter into the interior and complete the structure thereof.

Another object of the invention is the producing of a pressed or stamped artillery wheel assembly having a wheel member with considerably reduced tapered spokes integrally merged with an annular, diametrically large nave body having a relatively large central opening defined by an annular short flange which is adapted for alternative engagement with a number of diversified detachable bolting-on members.

Another object of the invention is the provision of a demountable wheel assembly for universal changeover for any of the conventional wheels, without materially altering the construction of the wheel assembly, by carrying detachably a bolting-on member which can be replaced by another bolting-on member for engagement with a particular hub of a vehicle without changing structurally the hub assembly.

Other objects and advantages of the invention will become apparent from the description of the accompanying drawings, in which Fig. 1 is an outboard side elevational view of an artillery wheel assembly.

Fig. 2 is a segmental inboard side elevational view of the artillery wheel assembly, showing interior construction.

Fig. 5 is an outboard side elevational view of a bolting-on member detachably employed with the central part of the wheel member.

Fig. 6 is a cross section of Fig. 5 taken on the line 6—6 as indicated by the arrows.

Figures 1, 3, 4:
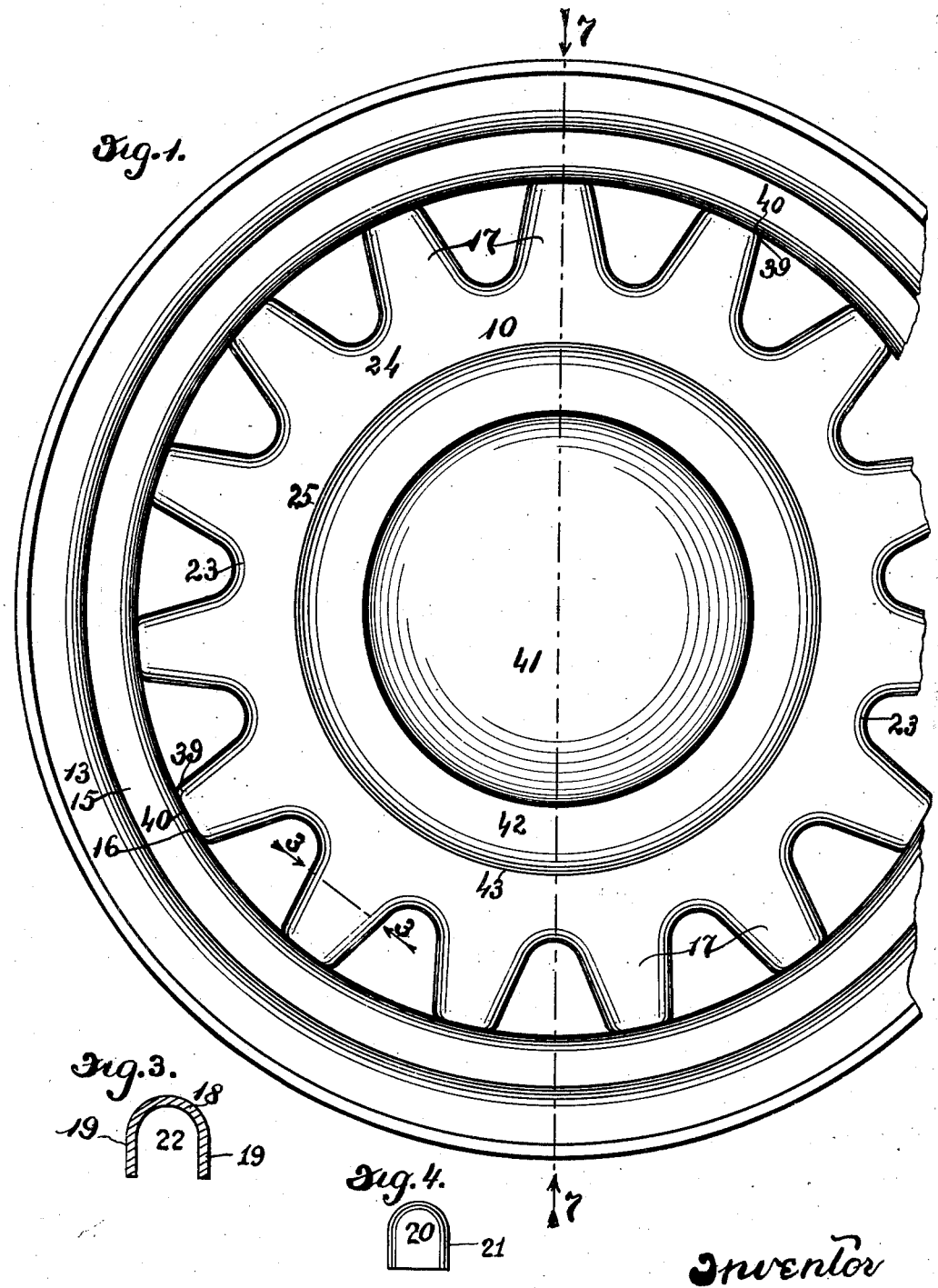
Fig. 3 is a cross section of Fig. 1 taken on the line 3—3 as indicated by the arrows.
Fig. 4 is an end view of one of the spokes of the wheel member.
Figure 7:
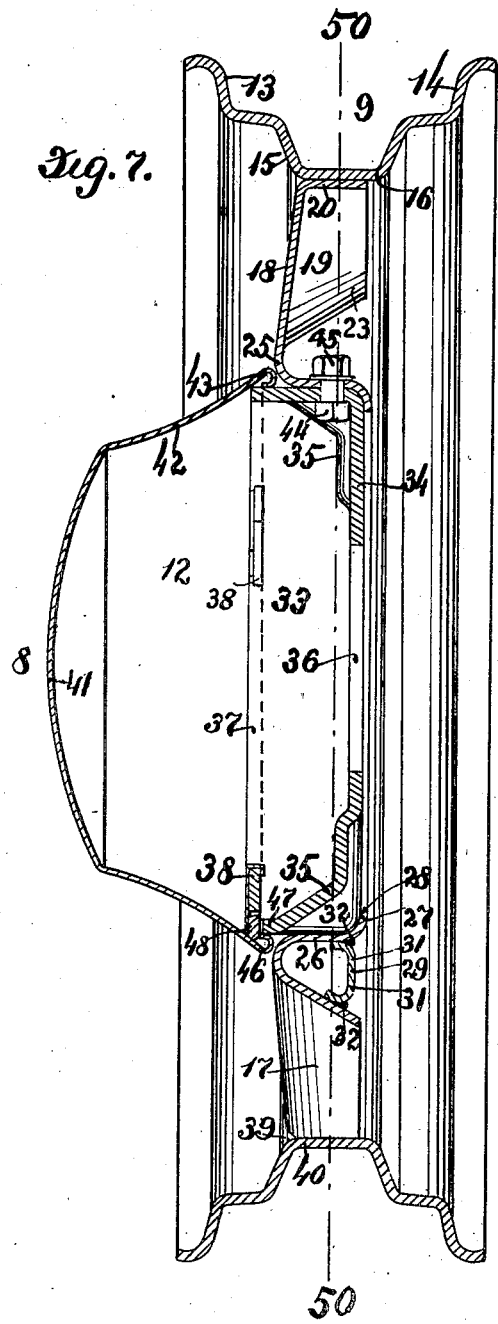
Fig. 7 is a cross section of Fig. 1 taken on the line 7—7 as indicated by the arrows.

The invention herein disclosed is a demountable artillery wheel assembly 8 comprising a universally so-called "drop-center" rim 9, a pressed or stamped artillery wheel body 10, a reinforced annular bolting-on member 11, and a cup-shaped hub shell 12 enclosing the entire central part of the wheel member and completing the wheel assembly.

The tire-rim 9 comprises annularly an outboard side tire-engaging gutter section 13, an inboard side tire-engaging gutter section 14, and an intermediate well section 15 formed with a base 16.

The wheel member 10 comprises annularly a series of radially tapered and convexed channeled short spokes 17 each formed with a front radial wall 18 curved laterally inwardly into merger with oppositely radially lateral walls 19 extending radially outwardly to formation of an integral transversely inward roof 20 surrounded by a curved side 21, having a radial channel 22 interiorly between the respective walls extended towards the axis of the wheel, and a curved laterally inwardly extended web 23 is integrally formed with each two radially inward ends of the spokes to circumferentially unite the spokes into an annular body 24 which extends circumferentially and radially inwardly into a merger with an annular laterally inwardly curved body 25 which is annularly merged with an annular laterally inwardly extended body 26 having annularly a radially short flange 27 defining a large central opening 28.

In connection with constructing of the wheel member 10 an economical advantage is obtained therein by having the wheel member formed of light gauge metal with short channeled spokes and the diametrally large nave portion having a considerably short radial flange defining a relatively large central opening. A structural advantage is had by forming the webs 23 extended from the sides of the radially inward ends of the spokes in a laterally oblique and inward direction, and, further, the annular laterally inwardly curved portion 25 attains rigidity for maintaining the integral formation between the ends of the spokes and the outboard side of the annular portion 26 and 27 in completing the wheel member.

In order to maintain these structural features I provide a number of arcuate channeled members 29 and force them into contact with the inboard side of the annular wall 24 one between the radially inward face of two webs 23 and the radially outward face of the inboard side of the annular portion 26 when required, but in the present instance the members 29 are pressed into position with the laterally outwardly formed flanges 31 engaged and welded with the webs 23 and member 26 at 32, owing to which the arcuate members 29 form a part of the wheel member and rigidly support the radial position of the walls 24 and 25 to resist side strains imposed thereagainst from every driving direction. When required, the number of the arcuate members 29 may be increased or a completely annular member may be attached to take the place of the severed or independent arcuate members, the referred to annular member being herein not disclosed.

The bolting-on and reinforcing annular member 33 comprises an approximately cylindrical annulus formed with an inboard side radial wall 34 in which are pressed portions 35 forming reinforcing ribs, and a central opening 36 adapted to receive the hub of a vehicle and form means defining the bolt circle of the bolting-on flange. The outboard side of the annular portion of the bolting-on member 33 is provided with an annular engaging portion 37 upon the radially inward face of which are a plurality of snapping-on members 38 for engagement with a hub shell which will hereinafter be described.

In order to complete the wheel member for carrying a pneumatic rubber tire, the wheel member 10 is pressed into the base 16 of the rim 9 and retains both structures in position as indicated at 39 and 40. The rim circumferentially braces the periphery of the wheel member while the radially inward side thereof is strengthened by means of the annular flange 26 and radial flange 27.

The hub shell 12 comprises an outboard side radial arched wall 41, an annularly arched wall 42 and an inboard side hooked engaging portion 43.

The anticipation of my invention is to provide the wheel member 10 with a tire-carrying rim for interchangeable engagement with all types of hub constructions now employed by car manufacturers and the distributing agencies of automotive accessories, with a view of exercising economy of production. As the various hub constructions are of different dimensions and one type of bolting-on member such as shown at 33, cannot be adapted to the dimensions of all hubs, the completed demountable wheel member is exclusively fitted for demountable engagement with one type of hub construction, and cannot be fitted to a hub of a different vehicle.

Therefore I propose to manufacture in quantity production the hereinbefore described wheel member 10 for all types of vehicles, and bolting-on members, of the type shown at 33, of various dimensions one for fastening to a particular spider structure which is adapted to a particular vehicle.

As a result of such arrangement of production, the wheel members are produced and may be supplied loosely and independently of the bolting-on members, while the latter are supplied accordingly.

For the purpose of completing the nave part of the wheel member 10, I fit detachably the bolting-on member 33 into contact with the outboard side face of the radial flanged portion 27 in the manner such that the peripheral portion thereof is in contact with the annular flanged portion 26 of the wheel member, with the radial flange 34 of the bolting-on member forming the inboard side of the nave having the central opening 36 for reception of the vehicle hub, after which the flanged portion 26 is bolted removably with the peripheral flanged portion by bolts 44 passed radially outwardly through openings therein and locked by nuts 45 secured to the outer portions thereof.

The hub cap 12 as shown at 46 is snapped on the outboard side 47 of the bolting-on member with the annular hooked portion engaging the snapping-with portions 48. When desired to separate the hub shell from the bolting-on member, the hooked portion 46 is pried off therefrom.

In the present application I have disclosed an improved artillery steel wheel, wherein the wheel member is formed from a blank steel sheet particularly provided with radiating channeled spokes closed at their radially outward ends and open at the inboard side thereof and a nave portion integrally drawn from the radially inward ends of the spokes and laterally inwardly extended to form the greatest possible central portion of the wheel diameter, with curved lines and joints to demarcate the symmetrical contours of the parts integrally constituting the structure.

One of the features of the herein disclosed invention particularly resides in the manner of securing a wrought iron tire-rim in rigid engagement with the ends of the spokes, by which to stiffen the position thereof and form a one-piece artillery steel wheel, the particular method by which this is successfully accomplished consists of forming the nave and spokes of a diameter greater than the diameter of the tire-rim by an amount suitable to provide a pressed fit and the peripheral faces of the spoke ends with yieldable or resilient roofs, and the tire-rim is annularly pressed on the spoke ends in the manner such that the former is truly aligned thereon with reference to the center line of the rim and wheel structure, thus placing the tire-rim under tension and the wheel under compression that the tire-rim is not apt to be separated from the spokes in service. The yieldable or resilient spoke ends are so formed that, under compression and tension effected by the tire-rim and wheel structure, the roofs thereof are also subjected to compression to the extent of augmenting the tension of the tire-rim, by which means the spoke ends are flush with the inner face of the tire-rim base with which the spokes are in rigid engagement. As an auxiliary and precautionary means, the compressed roofs of the spoke ends are welded to the tire-rim base in the manner of forming a smooth surface or connection between the spoke ends and tire-rim base.

Proceeding with the construction of my demountable steel wheel member particular attention is directed to the necessity of having the tire-rim in rigid engagement with the spokes of the wheel member to form an integral part thereof with a view of having road strains and shocks transmitted through the rim to the various spokes, by which the shocks and strains are dissipated before they reach the central portion of the wheel. It is important to eliminate formation of sharp angles which form weak points, and form easy and gradual curves, sharp turns and angles being avoided in the manner such that strains and shocks find no acute lines or turns of travel, but are absorbed while passing from one part of the construction to adjacent parts thereof along courses that can withstand strains and shocks to avoid breaking.

I anticipate that the trend of the car manufacturers is to extensively use the super balloon pneumatic tires having a relatively low air pressure with a considerably diametrically reduced tire rim, and therefore it is essential to construct the main wheel body on a reduced scale of construction to meet requirements to produce a light, strong, unique, steel wheel member commensurable to the reduction of the rim diameter without sacrificing the strength required to support a load in driving service.

In order to form a light but strong structure, I propose that the diameter of the nave portion of the integral nave and spoke member be made greater than the combined length of the oppositely arranged spokes thereof, thus the combined length of the spokes between the free faces of the spoke ends and the radially inward ends thereof is exceeded by the diameter of the nave portion between the radially inward ends of the spokes at one side to the radially inward ends of the spokes at the opposite side.

As I have hereinbefore generally described, the conventional demountable wire spoked and artillery wheel constructions are each provided with a bolting-on member usually secured to the inboard side thereof for mounting engagement with conventional hubs of vehicles. In connection with this it is required to provide a bolting-on member of a specific construction adapted for fastening to the specific wheel for the purpose of fitting with the specific hub of the vehicle for the reason that each vehicle hub is provided with a definite number of bolts and located at different spaced points on the hub, in view of which a similar number of bolt passing openings is required to provide in the bolting-on member to be properly inter-fitted with a bolt circle of the particular type of hub, that is, the bolting-on members of the conventional type are provided with different bolt circles each to be engaged with a hub provided with a corresponding number of bolts for passing into openings in the bolting-on members.

When wheels are provided with bolting-on members having different bolt circles, a great number of such wheels is required to produce, which are of the same diametrical dimension, for car manufacturers and for the replacement market, which number can be reduced in the process of manufacture to a small number when the bolting-on member is made standard to be fitted universally with all types of bolt circles, as a result of which a car manufacturer or a dealer in wheels may necessarily only stock up on a certain quantity of wheels having the universal bolting-on member that is interchangeable with all types of hubs having different numbers of bolts, in the manner which will hereinafter be described.

In connection with completing the wheel assembly as a universally demountable construction having a detachable generally alternatively engagement with a particular vehicle hub, preferably provide the wall 34 of the bolting-on member 33 in blank whenever it is required, and form bolt passing openings adapted for engagement with bolts of a particular vehicle hub, instead of forming the openings with the completion of the bolting-on member. As illustrated, the wall 34 may be formed with diversified bolt circles as shown at the dotted circles 49, for alternative engagement with various vehicle hubs.

As the wheel member 10 is formed to receive alternatively bolting-on members for alternative engagement with different vehicle hubs, the required diversified bolting-on members are each formed with a bolt circle for demountable engagement with a particular vehicle hub without altering the structure thereof, and the bolting-on member is carried by the wheel member as has hereinbefore been described.

In connection with forming the bolting-on member in general for demountable engagement with a vehicle hub, it is simultaneously adapted to carry detachably the hub cap which has hereinbefore been described, and each particular bolting-on member is provided with a snapping-with means for engagement with the cap and a vehicle hub engaging bolt circle portion for engagement with a particular vehicle hum.

Owing to the particular embodiments contained in the wheel member 10, bolting-on member 33 and hub shell 12, each member may be formed of cast material or forged material to suit the requirements of automobile manufacturers, but it is preferable that the parts of the wheel assembly are formed of sheet metal by pressing or stamping process.

The parts of the wheel assembly are symmetrically formed to commensurably align one with another in proportion to form light but exceedingly strong structures. The spokes of the wheel member are engaged with the rim base in the manner such that the spokes and the bolting-on member carry the load substantially in the zone line indicated by the center line 50 of the rim and the radial flanged wall of the bolting-on member having its peripheral annular flange extended laterally outwardly for the full length of the annular portion 26 of the wheel member, as a result of which the bolting-on member substantially carries the vehicle load. The formation of the spokes radially short and the radially inward ends thereof circumferentially brazed, forms means owing to which the radial line of the wheel member is made exceedingly rigid and strong to resist torque and side strains imposed thereagainst from every driving direction.

I am aware that modifications, variations and substitutions can be had without departing from the scope and spirit of the claim, and therefore I broadly claim the following:

A wheel assembly including a wheel body member, a tire-rim carried by said wheel body member, an annular wall extended radially-inwardly of the wheel body and merged with an annular flanged body having a central opening, a bolting-on member engaged with said flanged body and having cover member engaging means, and bracing members at the inboard side of the wheel body member adapted for stiffening the wheel body member radially and axially.

RICHARD B. MILLER.